(12) United States Patent
Hunt et al.

(10) Patent No.: US 9,316,029 B2
(45) Date of Patent: Apr. 19, 2016

(54) C-SHAPED ATTACHMENT ELEMENT FOR VEHICLE LOCK

(71) Applicants: Robert Hunt, Davisburg, MI (US); Robert S. Pettengill, Farmington, MI (US); Keith Julien, Canton, MI (US)

(72) Inventors: Robert Hunt, Davisburg, MI (US); Robert S. Pettengill, Farmington, MI (US); Keith Julien, Canton, MI (US)

(73) Assignee: Kiekert AG, Heiligenhaus (DE)

( * ) Notice: Subject to any disclaimer, the term of this patent is extended or adjusted under 35 U.S.C. 154(b) by 62 days.

(21) Appl. No.: 13/932,460

(22) Filed: Jul. 1, 2013

(65) Prior Publication Data

US 2015/0003897 A1    Jan. 1, 2015

(51) Int. Cl.
| | |
|---|---|
| F16B 7/08 | (2006.01) |
| F16B 9/00 | (2006.01) |
| F16L 41/00 | (2006.01) |
| E05B 79/16 | (2014.01) |
| F16L 3/00 | (2006.01) |

(52) U.S. Cl.
CPC . E05B 79/16 (2013.01); F16L 3/00 (2013.01); Y10T 403/39 (2015.01)

(58) Field of Classification Search
CPC ..... F16B 9/023; B65D 33/1675; F16L 3/233; F16L 3/2332; F16L 3/2336; F16L 3/237; F16L 3/00; Y10T 403/39
USPC ........... 403/94, 167, 175, 188, 197, 230, 346, 403/397, 399, 187; 248/71; 292/17, 76, 292/256, 256.6, 256.61, 305, 216, 201, 292/336.3, DIG. 23, DIG. 53, DIG. 54, 292/DIG. 64; 24/16 R, 17 R, 30.5 R, 30.5 P
See application file for complete search history.

(56) References Cited

U.S. PATENT DOCUMENTS

| | | | | |
|---|---|---|---|---|
| 1,981,973 | A * | 11/1934 | Tinnerman | 248/73 |
| 3,345,706 | A * | 10/1967 | Stokes | 403/397 |
| 3,913,187 | A * | 10/1975 | Okuda | 24/484 |
| 4,212,303 | A * | 7/1980 | Nolan | 606/120 |
| 4,835,824 | A * | 6/1989 | Durham et al. | 24/339 |
| 5,159,730 | A * | 11/1992 | Radvin | 24/543 |
| 5,967,468 | A * | 10/1999 | Veghte et al. | 248/71 |
| 6,161,804 | A * | 12/2000 | Paske et al. | 248/74.1 |
| 6,747,209 | B2 * | 6/2004 | Uchida et al. | 174/68.1 |
| 8,499,864 | B2 * | 8/2013 | Takenaka et al. | 180/7.1 |

FOREIGN PATENT DOCUMENTS

DE          3815027 A  * 11/1989

* cited by examiner

*Primary Examiner* — Gregory Binda
*Assistant Examiner* — Nahid Amiri
(74) *Attorney, Agent, or Firm* — Renner, Otto, Boisselle & Sklar, LLP

(57) ABSTRACT

An attachment element (1) connecting a locking bar (4) of a lock (2) of a motor vehicle to an actuation lever (5) of a motor vehicle lock (2), wherein the attachment element (1) consists of one part and is C-shaped, and wherein the limbs (11, 12) of the C-shape (10) are connected with each other in a hinge-type connection and are designed so that they can be connected positively and/or frictionally with an opening (6) of a lever (5).

16 Claims, 2 Drawing Sheets

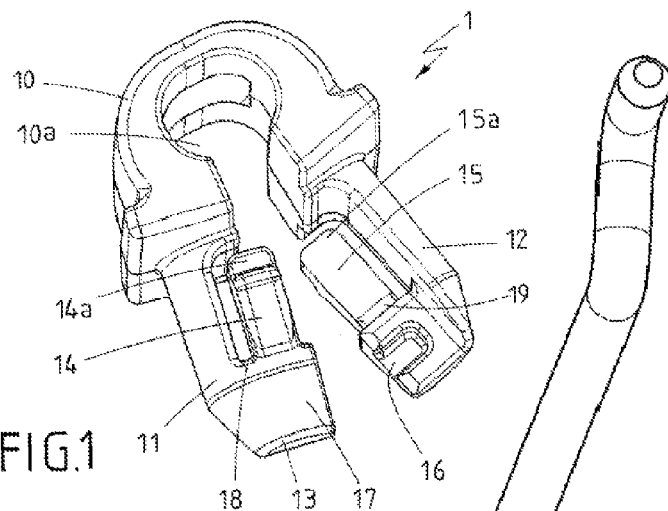
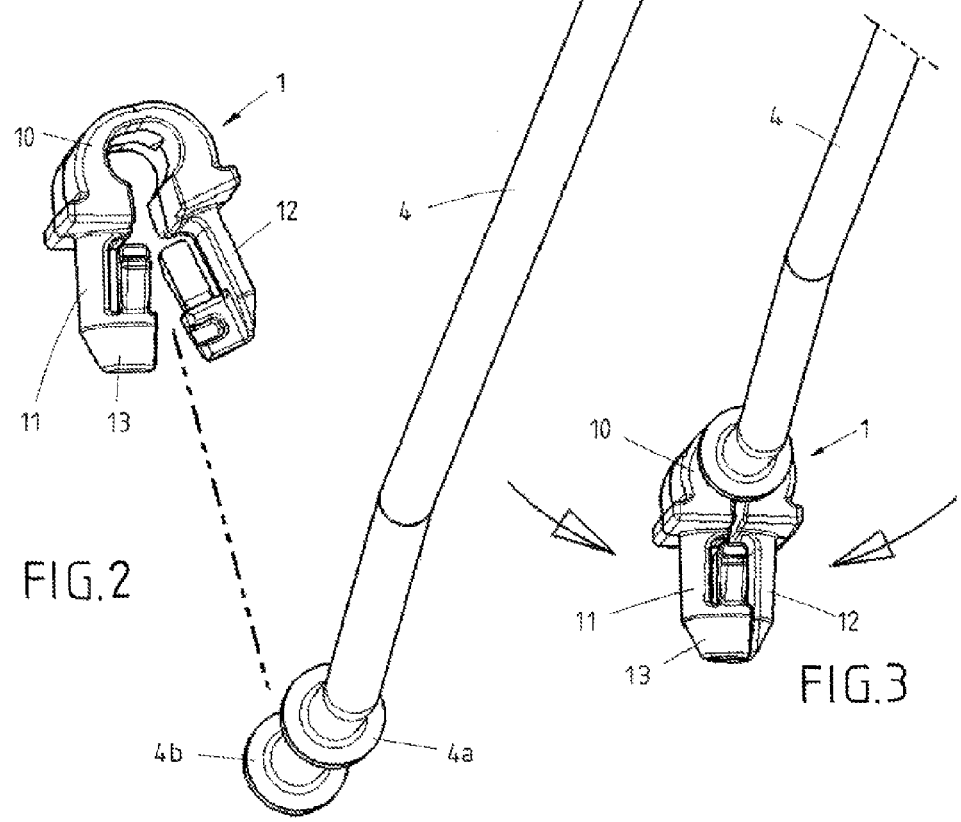

C-SHAPED ATTACHMENT ELEMENT FOR VEHICLE LOCK

The invention relates to an attachment element for a lock for connecting a locking bar with an actuation lever of a motor vehicle lock.

BACKGROUND

The publication U.S. Pat. No. 7,175,209 B2 discloses an attachment element for connecting two components for a lock. At least one component is bar-shaped, specifically as a locking bar between a locking lever of a motor vehicle door and a door lock arranged in the door. Locking means are provided to disable actuation of the lock for opening the door in order to thereby prevent an opening of the door.

As a rule, with a locking system of motor vehicles, a distinction is made between an external locking lever and an internal locking lever, with the external locking lever frequently being formed by a lock cylinder supported rotatably in a door handle. As interior locking levers, buttons that are supported movably and separately in the door trim and also levers to be actuated in combination with the door opening lever proved to be useful.

As a rule, the connection between the locking levers on the door and the levers arranged in the door lock is usually accomplished by a locking bar extending in the door cavity. Here, provisions are frequently made to connect the locking bar with the external locking lever or with the internal locking lever mechanically by means of hooking them together. At the lock, the connection is made with the lock locking lever that usually protrudes from the lock housing by means of locking ("clipsing") via locking elements. "Clipsing" means insertion followed by a positive locking of a connecting element between the locking bar referred to above and the usually hole-shaped opening in the locking lever of the lock.

According to the prior art referred to above from U.S. Pat. No. 7,175,209 B2, a means of attachment consists of two approximately block-shaped elements that are each axially symmetrical and are locked with each other on one or two sides with inclusion of the locking bar. A part of one of the two block-shaped elements is shaped as a second locking device with four parallel pin parts that are arranged at a distance from each other and are symmetrical in rotation relative to each other, at whose ends a hook-shaped locking element with an incline for locking with the locking lever of the lock is provided.

SUMMARY

The present invention addresses the problem of providing a typical attachment element that can be produced cost-efficiently and is, specifically, easy to install while making it possible to achieve by means of the attachment element a connection of the levers that is secure even when exposed to high stress during the operation of the vehicle.

The problem is solved by an object with the characteristics of claim 1. Advantageous embodiments are disclosed in the related claims. The problem is also solved by an object with the characteristics of the secondary claims.

In order to solve the problem, an attachment element for a lock for connecting a locking bar with an actuation lever of a motor vehicle lock, consists of one part and is C-shaped. The limbs of the C-shape are connected with each other by a hinge (i.e. hinge-type) connection and are designed so that they can be connected positively and/or frictionally with an opening of a lever. On the one hand, this makes a simple installation of the attachment element possible, for example by pushing open its C-shaped ends that are spread when unstressed and terminate in a limb-shaped fashion and by simply pushing the C-shaped base body onto the locking bar. After the limbs are locked with each other, the installation is completed by locking the limbs with their preferably tapered or cone-shaped ends in the opening of the actuation lever.

An advantageous embodiment provides for the two limbs to be moved into an overlapping position by a movement of the hinge. This effects a simplified installation, specifically the positioning of locking elements arranged inside the limbs.

In an advantageous embodiment, an attachment element is provided where the two limbs in overlapped position form a tapering end. This additional design variant also simplifies the assembly with the actuation lever.

In an advantageous embodiment, an attachment element is provided where the tapering end is cone-shaped. This facilitates a simplified insertion of the attachment element into the locking lever.

In an advantageous embodiment, an attachment element is provided where the limbs are connected elastically/resiliently. This makes it possible to significantly simplify the assembly during the initial placement onto the locking lever because in unstressed condition the limbs are located in a defined starting position.

In an advantageous embodiment, an attachment element is provided where, in unstressed condition, the limbs are arranged in a V-shape. Especially in combination with the elastic connection of the limbs, this starting position further simplifies the subsequent assembly.

In an additional advantageous embodiment, the limbs are locked in stressed, compressed condition. In a space-saving, simple design, and the locking is accomplished via a recess formed on the ends of the limbs and an elevated area that is complementary thereto. The locking also simplifies the installation, specifically during the final connecting process of the locking bar and the locking lever.

In an additional advantageous embodiment, an attachment element is provided where each limb comprises a locking element on the inside. Specifically, the locking elements are designed so that they are able to form a locked connection together with an opening in a lever. Among other things, a very secure locked connection of the two levers, even during operation of the vehicle involving very high (impact) stresses, can thereby be achieved in a space-saving way.

In an advantageous embodiment, an attachment element is provided where the two limbs can be put into an overlapping position and where, in this overlapping position, the two locking elements are arranged to face each other. This results in especially small installation space requirements.

In an advantageous embodiment, provisions are made to make it possible to move the free ends of the two locking elements in the overlapped position towards each other against an elastic force. This makes for a simple handling of the attachment element prior to insertion into and locking with ("clipsing") the actuation lever.

In an advantageous embodiment, an attachment element is provided where each end of a locking element is ramp-shaped. This design achieves a further simplification of the handling of the locking element prior to insertion and locking ("clipsing").

In an advantageous embodiment, an attachment element is provided where each end of a locking element has an L-shaped contour. With this design, an especially secure interaction of the locking limbs is achieved.

In an advantageous embodiment, an attachment element is provided where, by means of a web, at each end of a limb a locking element is attached that extends parallel to the associated limb in the direction of the base of the C-shape. This design of the locking element also optimizes the interaction of the essential locking elements behind the C-limbs for the ultimate locking of the two levers.

In an advantageous embodiment, an attachment element is provided where the C-shaped base part is able to serve as guide for the locking bar. On the one hand, this promotes an essentially tolerance-free operation during the locking process and, on the other hand, produces a low-noise locking support.

In an advantageous embodiment, an attachment element is provided that is made of plastic. A simple installation, especially when an elastic plastic material is used, as well as weight savings are achieved in this way.

The invention also relates to a lock for a motor vehicle comprising a bar and a lever as well as a one-piece C-shaped connecting element that connects the bar with the lever where the C-shaped element encloses the bar, and the two limbs of the C-shaped connecting element reach through an opening in the lever and are positively and/or frictionally connected with the opening. This supports a simple installation of the lock, and a very secure connection is achieved of the locking lever with the lock even during vehicle operations involving high (impact) stresses. Regarding the objects according to the claim, the number of required components is always kept low which facilitates production and installation.

BRIEF DESCRIPTION OF THE DRAWINGS

Below, the invention is explained in detail with reference to drawings wherein:
FIG. 1 shows the attachment element,
FIG. 2 shows the attachment element according to FIG. 1 prior to the installation,
FIG. 3 shows the attachment element according to FIG. 1 mounted on the locking bar.

DETAILED DESCRIPTION

Figure 4:
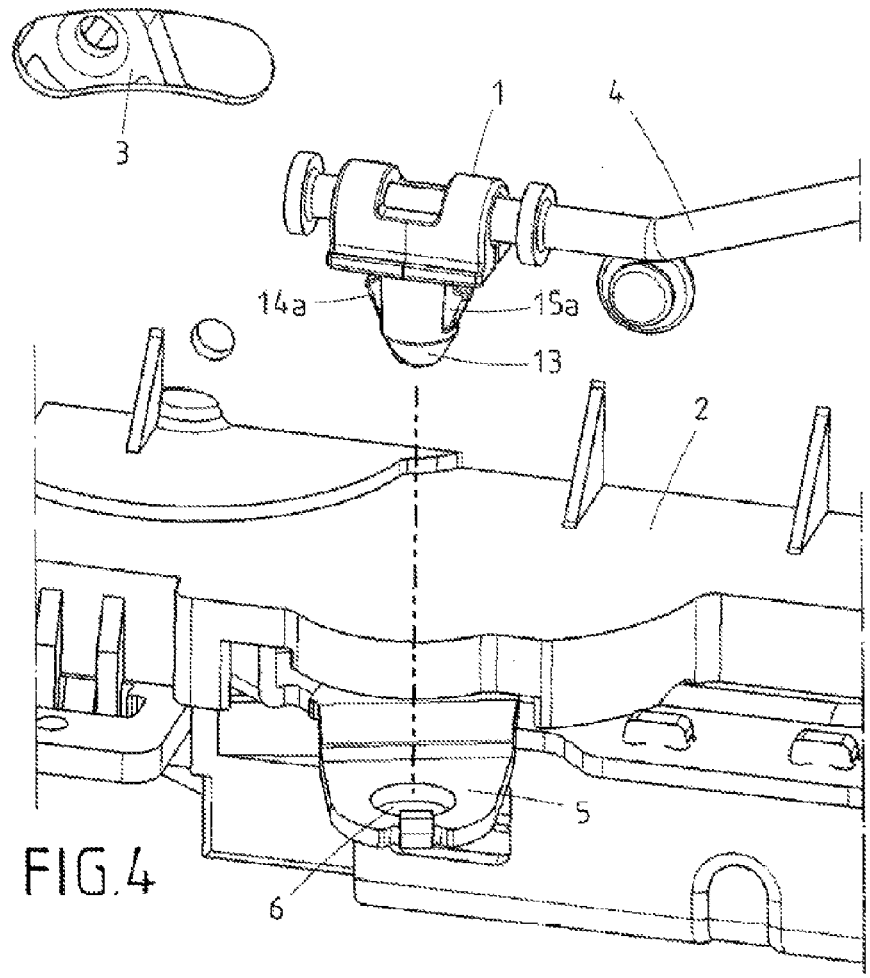
FIG. 4 shows the locking bar with the attachment element prior to the connection with the actuation lever.

FIG. 1 shows an attachment element 1 made of an elastic plastic material with a C-shaped base part 10 and the C-limbs 11, 12 that are spread open in unstressed condition due to the elasticity of the material. The opening 10a that is formed by the C-shaped base part 10 and later encloses the locking bar 4 can be seen. At the end facing away from the C-shaped base part, the limbs 11, 12 are cone-shaped 13 or tapered 13 for insertion into the opening 6 of an actuation lever 5 (FIG. 4). Also, the end sections of the limbs 11, 12 comprise a recess 16 in one of the limb end sections and, on the limb end section 17 of the other limb, a raised area that is of complementary design to the recess and serves for locking the limbs 11, 12 after they are compressed (pressed together).

In addition, each limb 11, 12 comprises on its inside a locking element 14, 15, with these locking elements 14, 15 being designed so that they are able to form a locked connection in conjunction with the opening 6 in the actuation lever 5. During the later overlapping compression of the limbs 11, 12 against an elastic force, the two locking elements 14, 15 are moved towards each other. The ends 14a, 15a of the locking elements 14, 15 are ramp-shaped and have an L-shaped contour. At each end of a limb 11, 12, a locking element 14, 15 is attached by means of a web 18, 19 that extends parallel to the associated limb 11, 12 in the direction of the base 10 of the C-shape.

FIG. 2 shows the spread-open attachment element 1 according to FIG. 1 prior to its placement on the locking bar 4, specifically in between the locking disks 4a, 4b formed thereon.

FIG. 3 shows the attachment element 1 after its placement on the locking bar 4, with the C-shaped base body 10 enclosing the locking bar 4. The limbs 11, 12 are subsequently compressed for later locking ("clipsing") of the attachment element 1 with the actuation lever 5 of the motor vehicle door lock 2, and are locked with each other by means of the recess 16 shown only in FIG. 1 and the complementary raised area 17 in the limb ends. In this condition, the two limbs 11, 12 have been put into an overlapping position, as explained above, with the locking elements 14, 15 shown only in FIG. 1 being arranged to face each other in this overlapping position.

FIG. 4 shows the attachment element 1 attached to the locking bar 4 according to FIG. 3 prior to its locking ("clipsing") with the actuation lever 5 of the lock 2. The locking bar 4 is connected with the door handle 3 by means of a connecting nut (not shown).

Figure 5:
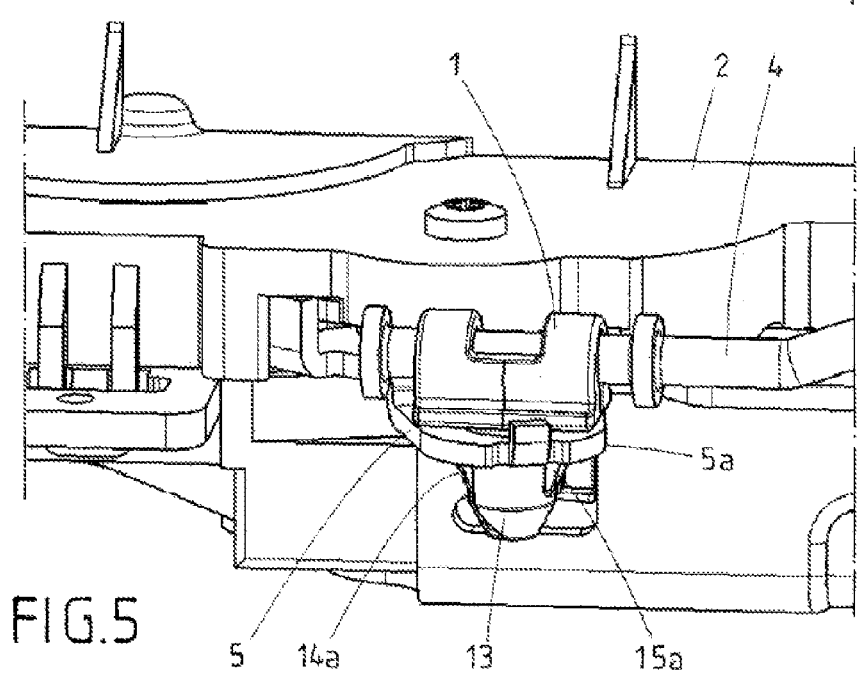
FIG. 5 shows the locking bar locked ("clipsed") with the actuation lever.

FIG. 5 shows the locking bar 4 locked ("clipsed") with the actuation lever 5 in the opening 6 via the attachment element 1. It shows the interaction, shown in detail in FIG. 1, of the locking elements 14, 15 in that the associated ends 14a, 15a of the locking elements are locked behind the lever flange 5a, thereby establishing the secure positive connection.

LIST OF REFERENCE NUMBERS 1 attachment element
2 motor vehicle lock
3 door handle
4 locking bar
4a locking disk
4b locking disk
5 actuation lever, lock
5a lever flange
6 opening actuation lever
19 C-shaped base body
10a opening
11 limb
12 limb
13 cone-shaped end
14 locking element
14a locking element ends
15 locking element
15a locking element ends
16 recess
17 elevated area
18 web
19 web

What is claimed is:
1. An attachment element for a lock for connecting a locking bar with an actuation lever of a motor vehicle lock, wherein the attachment element comprises one part, the one part including a C-shaped base and two limbs, and wherein the C-shaped base comprises a hinge and the two limbs are connected with each other via the hinge so that they can be connected positively and/or frictionally with an opening of the actuation lever,
wherein each limb has an inside locking element that extends from an end of the limb toward the C-shaped base, which forms a locked connection in conjunction with the opening in the actuation lever, wherein the two limbs are moveable into an overlapping position by a movement of the hinge, and in the overlapping position the two limbs form a cone-shaped end that tapers in a direction going away from the C-shaped base, and wherein each inside locking element extends in a longitudinal direction from a lower surface of the cone-shaped end toward the C-shaped base, and each inside locking element is spaced apart from each respective limb.

2. The attachment element according to claim 1, wherein the limbs of the attachment element are connected with each other elastically.

3. The attachment element according to claim 1, wherein the limbs spread from the C-shaped base in a V-shape in a non-compressed condition.

4. The attachment element according to claim 1, wherein the limbs in stressed, compressed condition are locked specifically by means of a recess formed in end of one limb and a complementary raised area in the end of the other limb.

5. The attachment element according to claim 1, wherein in the overlapping position the locking elements are arranged to face each other in this overlapping position.

6. The attachment element according to claim 5, wherein, in the overlapping position, free ends of the two locking elements are moved towards each other against an elastic force.

7. The attachment element according to claim 1, wherein each end of the inside locking elements is ramp-shaped in a direction extending from the end of a respective limb toward the C-shaped base.

8. The attachment element according to claim 1, wherein each end of the inside locking elements has an L-shaped contour.

9. The attachment element according to claim 1, wherein, at each end of a limb, the locking element is attached by means of a web that extends parallel to the associated limb in the direction of the C-shaped base.

10. The attachment element according to claim 1, wherein the C-shaped base is a guide for connecting to the locking bar.

11. The attachment element according to claim 1, wherein the attachment element is made of an elastic plastic material.

12. A lock for a motor vehicle comprising a bar and an actuation lever as well as the attachment element according to claim 1 that connects the bar with the actuation lever, where the C-shaped base of the attachment element encloses the bar, and where the two limbs of the attachment element reach through the opening in the actuation lever and are positively and/or frictionally connected with the opening.

13. An attachment element for connecting a locking bar with an actuation lever of a motor vehicle lock, the attachment element consisting of one part that has a C-shaped base and having limbs that are connected with each other by a hinge connection so that the limbs can be positioned around the locking bar and urged together to clamp the locking bar therebetween, and the limbs having end portions that interengage with one another to form a peg having a tapered end portion to facilitate insertion of the peg into an aperture of the actuation lever, and wherein at least one of the end portions has a resiliently deflectable locking element that can deflect inwardly to permit passage of the peg through the aperture at a front side of the actuation lever and then spring back to engage a back side of the actuation lever, and wherein each limb has an inside locking element that extends from an end of the limb toward the C-shaped base, which forms a locked connection in conjunction with the aperture of the actuation lever, and wherein the peg comprises a cone-shaped end that tapers in a direction going away from the C-shaped base, and wherein each inside locking element extends in a longitudinal direction from a lower surface of the cone-shaped end toward the C-shaped base, and each inside locking element is spaced apart from each respective limb.

14. The attachment element of claim 13, wherein each limb includes a respective said locking element, and the limbs have an interior recess for accommodating inward deflection of the locking element.

15. The attachment element of claim 13, wherein the locking element extends in a direction parallel to a center axis of the peg.

16. The attachment element according to claim 13, wherein the limbs spread from the C-shaped base in a V-shape in a non-compressed condition.

* * * * *